Nov. 5, 1957   J. R. OISHEI ET AL   2,811,735
WINDSHIELD CLEANER
Filed Sept. 10, 1954   2 Sheets-Sheet 1

INVENTOR.
John R. Oishei and
BY Martin Bitzer

Bean, Brooks, Buckley & Bean
ATTORNEYS

Nov. 5, 1957  J. R. OISHEI ET AL  2,811,735
WINDSHIELD CLEANER
Filed Sept. 10, 1954  2 Sheets-Sheet 2
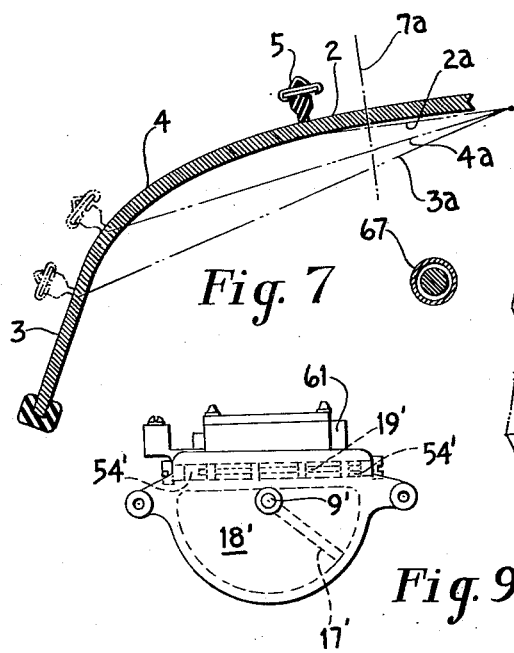
Fig. 7
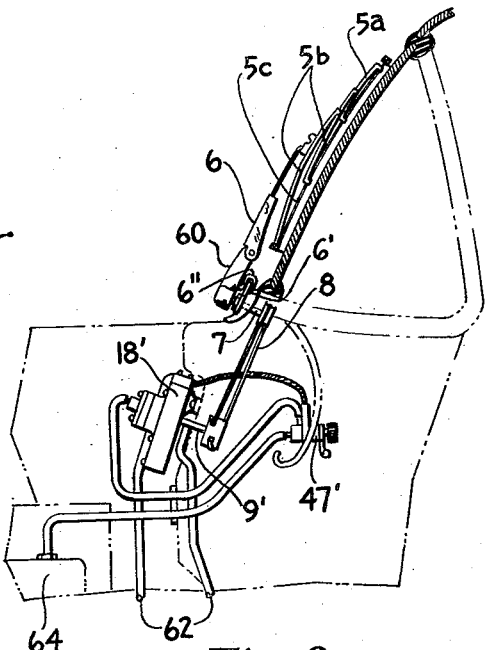
Fig. 8
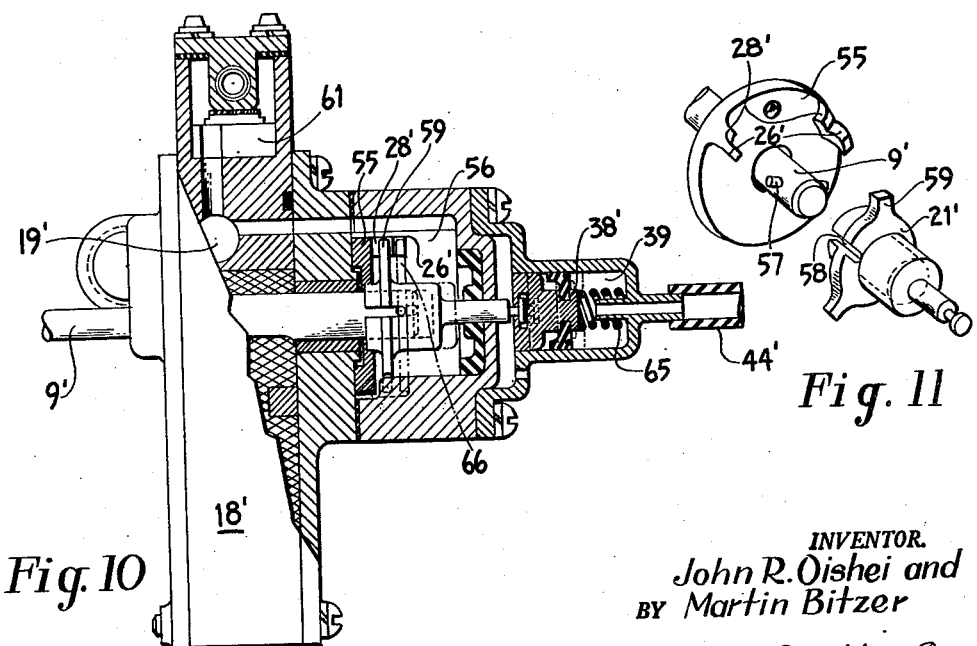
Fig. 9
Fig. 10
Fig. 11
INVENTOR.
John R. Oishei and
BY Martin Bitzer
Bean, Brooks, Buckley & Bean
ATTORNEYS United States Patent Office 2,811,735
Patented Nov. 5, 1957

2,811,735

WINDSHIELD CLEANER

John R. Oishei, Buffalo, and Martin Bitzer, Kenmore, N. Y., assignors to Trico Products Corporation, Buffalo, N. Y.

Application September 10, 1954, Serial No. 455,211

22 Claims. (Cl. 15—253)

This invention relates to the automotive field and especially to the windshield cleaning art with particular reference to the cleaning of the recently introduced panoramic or wrap-around type of windshield wherein surface areas of irregular or compound surface contours are extended around to the side of the vehicle.

One of the well recognized virtues of the wrap-around windshield is the panorama afforded as a result of the elimination of the formerly used corner posts at opposite sides of the windshield. The chief advantage gained is a clear lateral vision so desirable on the driver's side of the car in meeting oncoming vehicles moving in the opposite direction on a highway, and on the opposite side of the car in overtaking vehicles on divided highways. This feature of the panoramic shield has demanded the extension of the wiper blade into the lateral area of the shield to preserve the advantageous vision to the side. Consequently, longer wiper and arm assemblies have been required, the wiper embodying a superstructure that compels conformance of the blade to the surface being wiped, and the wiper carrying arm incorporating a normalizing feature for maintaining the wiper substantially upright on the surface while passing thereover, all necessitating more motive power to move the heavier cleaner mechanism and to overcome the added resistance occasioned in returning the wiper from the lateral area back over the crest of the curvature and into the windage.

While the addition of the lateral wrap-around extensions to the windshield were brought into being to give the motorist the advantage of lateral unobstructed vision in a more congested traffic, such lateral vision area is little used on express highways and thruways, where crossroad intersections are eliminated completely and interchanges are provided with paralleling entranceways extending one thousand feet long in the most modern roads. Those traveling on the expressways have this side entrance roadway in sight for hundreds of feet ahead and a vehicle entering is readily visible through the frontal or primary vision area of the shield. Clear vision through this primary vision area alone is vitally needed at higher speeds.

Such newer type curved windshields which require the location of arm and blade carrying pivot shafts further outwardly from the center line of the vehicle than heretofore. These shaft mountings for wipers provide a fulcrum point around which the blade and arm are oscillated to include in the panoramic vision area a portion of the lateral windshield surface in addition to the movement of the blade across the frontal section. The fulcrum pivot point provided by the shaft is positioned inwardly from the crest of curvature and outwardly of the steering column, or at least in a position where the blade, extending upwardly in a perpendicular plane, will be slightly outwardly of the steering column line. The steering column line, in turn, fixes the driver's primary line of sight as the driver is seated behind the wheel in driving.

These modern windshield constructions have burdened wiper systems with a requirement of a wider arc of travel of the blade to encompass both the frontal and the lateral sections of the windshield. The increase in the angular movement of the wipers (more recently brought up to as much as 128°), involves a longer time interval between successive strokes across the primary sight line and results in a slower frequency of oscillation. This wide range travel of the wiper, while desirable for motor vehicle travel at moderate speeds, becomes a drawback in attempting to provide better vision at higher speeds as being too slow to remove the faster accumulation of moisture.

To meet the situation, the instant invention includes a two-range wiper system whereby the control of the arc of travel of the blade may be alternately shifted from a long arc of travel to a shorter arc, the latter arc being confined to a blade travel which limits the motion on the outboard stroke to a suitable degree to maintain in front of the driver the all-important vision area directly ahead by better lifting the greater accumulation that follows with the higher car speed which the motorist is invited to use on the super highways and thruways of recent construction.

Therefore, the primary aim of the present invention is to provide a windshield cleaner having dual cleaning ranges corelated with the panoramic and frontal patterns of the wrap-around type of windshield and selectively operable either to effectively wipe either a panoramic field of vision forwardly and laterally of the vehicle or a relatively flatter though narrower forward field of vision to the exclusion of the lateral area whereby the driver of the vehicle may have a panoramic wide arc driving range for general use or a forward outlook alone for the higher speeds permitted on the long distance thruways. Advantage is herein taken of the fact that during fast driving the motorist will generally fix his gaze ahead and take little notice, if any, of traffic conditions observable through the lateral areas provided by the wrap-around extensions since at high speeds of travel he can see everything through the relatively narrow frontal area that is vital to his safety, as a rule. With the present invention, it is therefore possible to more or less cancel out the lateral areas and to concentrate the wiping effort to the more important frontal area, which latter may be common to both ranges of wiper movement. Vision is thereby maintained through the frontal area at all times and preferably without a change in the angular velocity of the wiper.

The outer limit of this restricted wiper movement on the frontal area may be short of a position wherein the full force of the windage is felt to thereby relieve the motor of this added resistance in returning the wiper inwardly. By holding the outmost limit of travel of the blade in the narrowed range to a position just beyond the vertical plane of the arm carrying shaft, the wiper is maintained on the frontal area and prevented from moving out over the crest. Where a fluid pressure motor serves as the power source for the cleaner system, the cancellation of the lateral area will reduce the volumetric displacement in the motor chamber by arresting the motor piston in its travel in one direction while maintaining a substantially full travel pattern inwardly of the arm pivot shaft to provide the required vision area for thruway travel. The cancelled lateral area to the left of the driver is no substantial loss during high-speed driving where the focusing of the eyes is on the line of sight directly ahead.

The narrowed range of blade travel has the effect of shifting the cleaner area inwardly, so that the center line of the wiper path and the center line of the piston travel may also be considered as being shifted inwardly toward the center of the car from its wide arc center line established in the use of the wider wiping pattern. A selector means is arranged to permit the driver of the vehicle to optionally select either one center line of movement or the other, this being accomplished effectively by a valving mechanism employed to retain the same rate of fluid flow into and out of the motor chamber to derive the required differential pressure which provides the torque. The advantage accruing as a result of shifting the center line of the wiper path inwardly toward the center line of the car in more central area of the wipe is gained by causing the reversal of direction of the blade closer to and more usable in its effective vertical area through which the line of sight is most constant.

Maximum efficiency of the windshield cleaner is limited to a predetermined angular velocity beyond which the cleaner will lose efficiency by failing to properly squeegee the water from the surface under a given arm pressure. Then, too, it is possible with an excessive speed to lift the wiper entirely from the glass as it moves over the crest of the curvature or even to lose control of it and result in a scratching of the glass to mar the field of vision. For normal driving, the factory prescribed wiper speeds vary upwardly from 120 strokes per minute. The modern motor car employs a blade and arm structure approximately 18 inches in length. The outer end of the blade will travel a distance of approximately 40 inches on each oscillation of 128 degrees at the rate of 180 wipes per minute. This frequency is probably greater than it should be for good cleaning performance on the curved windshield, and it cannot be increased without sacrifice. To accelerate the wiper beyond this number of strokes on the panoramic windshield is impractical for several reasons, such as the failure of the wiper to squeegee the water off the glass; excessive wear and tear on the surface conforming superstructure of the wiper, with the probability of scratching the glass; and an exceptional loading of the wiper motor in moving the wiper back up over the crest of the curved surface on the return stroke, in addition to the inertia factor. Therefore, while the panoramic windshield is desirable for normal driving, it nevertheless embodies a pattern which precludes a faster rate of oscillation of the wiper being used in order to maintain the vital forward field of vision clean for taking full advantage of the higher legal speeds of the thruways. The surface contour of the frontal area itself will accommodate an accelerated rate of oscillation which for the higher thruway speed of travel can be safely raised to 250 strokes per minute to adequately remove the faster accumulation of moisture thereon.

In an earlier Patent No. 2,691,186, a pair of cooperating wipers is employed for each half of the windshield, with the wipers acting in alternation upon the respective field of forward vision so as to secure the greater rapidity of wipes and at the same time to hold the number of wipes of each blade within practical limits. This gained the advantage of doubling the wiping frequency across the frontal field which doubling was maintained for all wiper speeds. Such an arrangement, however, partly doubled the equipment and accordingly increased the cost of installation. In contrast, the present invention secures an increased number of shorter wipes on the frontal area, which can accommodate it because of its flatter contour, and a lesser number of longer wipes on the under and more deeply curved panoramic field which includes the frontal area and the wrap-around extension. The changeover from one range to the other may be optional with the driver, or it may be effected automatically in response to predetermined speed changes.

The limitation on the speed of oscillation for maximum efficiency, the added load on the power unit of the windshield cleaner system in moving the longer and heavier arms and blades over the crest, the increased friction between the moving parts of the self conforming wiper with the resultant wear and tear, the probable scratching of the glass, and the failure in the squeegeeing action at an excessive windshield wiper speed, are all factors in restricting the speed of travel of the wiper when cleaning the wrap-around extension of the panoramic field.

It is therefore a further object of this invention to provide means whereby the driver of the vehicle may select the wiper range or sweep of his choice, either to take the wide arc or panoramic wipe to lift the moisture from both the frontal and lateral areas, or he can safely cancel the lateral field area and obtain in exchange therefor an accelerated lifting of the faster accumulating moisture on the frontal field alone during faster travel. At night the lateral areas of the panoramic windshield are unusable on unlighted highways and thruways since the major visibility is derived from the headlight beams which are focused on the roadway ahead. To assist the motorist particularly in night driving, lines are painted on the road surface to guide and give direction and these can only be seen through the frontal section of the shield.

The objective herein is accomplished by a single mechanism designed to give two selective range patterns into which the oscillating arm and blade members may be optionally carried. This is accomplished by corelating the wiper movement to the two major fields of vision found in the panoramic windshields to give a faster rate of oscillation of the wiper in one range as compared to a slower rate of oscillation in the other range, both ranges being negotiated at all times preferably at substantially the same angular velocity for the wiper, although the teaching of this aspect of the invention can be practiced by a wiper system having dual ranges which have differing angular velocities obtained from a constantly rotating drive. The magnified number of wiping movements in the narrowed range is gained without sacrificing any of the wiping efficiency or the quality of wipe, the end result of better vision being achieved solely by means of the reversal frequency as predetermined for the surface contour of the particular range.

Further, the invention will be found to reside in an improved windshield cleaner mechanism by which the cleaning ranges may be selected in a practical manner.

The foregoing and other objects will manifest themselves as this description progresses, reference being made therein to the accompanying drawing, wherein Fig. 1 is a fragmentary perspective view of an automobile equipped with a suction operated windshield cleaning system embodying the present invention;

Fig. 7 is a transverse sectional view through the windshield showing schematically, by the chords of their paths, the wide arc and narrow arc ranges of the wiper;

Fig. 8 is a view depicting a hydraulic windshield cleaner embodying the present invention;

Fig. 9 is an elevation of the hydraulic cleaner motor;

Fig. 10 is an edge view of the motor showing it mostly in vertical section; and

Fig. 11 is an exploded view of its selector.

Figure 1:
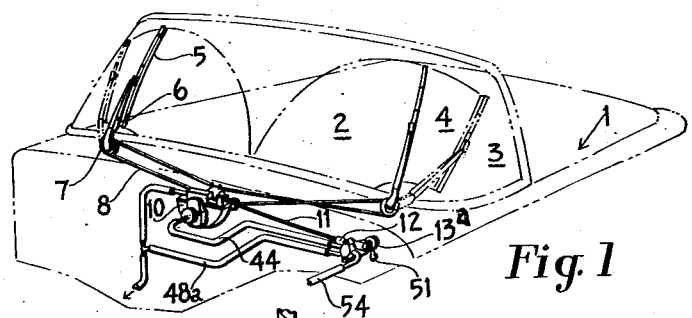

Referring more particularly to the accompanying drawing, the numeral 1 designates a motor vehicle having a curved windshield of the panoramic or wrap-around type with a frontal area 2 flanked by lateral areas 3 and connecting crest portions 4. Each wiper 5 is carried by an arm 6 fixed to a rockshaft 7, the latter being connected by a cable or other linkage 8 to a motor shaft 9 of the suction operated windshield cleaner motor 10, the control valve of which is regulatable by a Bowden wire 11 coupled through a rack and pinion unit 12 to a rotatable shaft 13, equipped with a hand knob 13a. To clean the wrap-around area 3, 4, each wiper is made longer than that heretofore used on flat windshields and is surface conforming in character, the same having a pressure distributing frame consisting of a yoke 5a, levers 5b, and a flexible backing strip 5c for the rubber blade. Likewise, the wiper carrying arm is made longer and stronger for transmitting the driving torque from a driving motor also made larger to withstand the greater load and inertia factors. As the wiper is oscillated through its primary or panoramic range across the respective windshield areas from the frontal to the lateral, a wide panoramic field of vision is obtained through which the motorist gains the benefit of the traffic panorama forwardly and laterally of the vehicle. This is desirable for normal driving and in congested traffic. In so moving over the laterally curved wrap-around area 3, 4, the yoke and link parts of the superstructure have considerable movement in adjusting themselves relative to each other to conform the blade to the more sharply curved crest portion 4 of the surface contour for effective cleaning. This folding and unfolding of the superstructure, coupled with the added effort required to return the wipers concurrently up over the crest portions in the face of strong wind currents, add materially to the load of the motor and to the time interval between wipes across the line of sight. Because of these circumstances, involving also the factor of wear and tear on the mechanism, the frequency of wipes across the panoramic field 2, 3, 4 is limited in number to avoid an impaired field of vision through squeegeeing failure and skipping of the blade.

The motor is illustrated as being of the suction actuated type. In this motor the pressure impulsations are applied alternately in opposite directions to the vane-like piston 17 on shaft 9, the latter being journaled in a bearing 15 within the motor chamber 18. The power switching member in the form of a valve 19 is journaled on a tubular stub shaft 20 within a valve chamber 16 and rocked by a kicker 21 under the urge of a spring 22 to alternately connect the pressure supply port 23 to the usual two chamber ports 24 of which only one is shown, all in a well-known manner and as more fully illustrated in Patent No. 2,670,720. The kicker has its back face hollowed out to fit over a shaft carried arm 25 for relative movement to the extent defined by spaced shoulders 26. These shoulders 26 serve to define the wiper movement to fit the panoramic wide arc driving range coextensive with the areas 2, 3, 4. As the motor shaft is rocked, the outer end of the arm 25 will carry the kicker with it until the kicker fastened end of the spring 22 is moved through the plane including the axes of the motor shaft 9 and the spring supporting pin 27 whereupon the spring will take over and move the kicker to shift the valve 19 to its other operative position. Upon the reverse movement the arm 25 will engage the companion shoulder 26 and impart a reverse direction to the kicker for again being snapped over by the spring to rock the valve back to its former operative position.

In accordance with the present invention, a second range of wiping strokes of higher frequency is provided that is restricted to the frontal area alone selectable for use in the faster travel on the long distance thruways where the legal limit of travel is higher. This is accomplished by means acting to differentially or disproportionately preshorten the wiper stroke to fit it to the frontal area for straight ahead vision, such means herein being incorporated in the power applying mechanism for the motor drive. To this end the kicker is provided adjacent one shoulder 26, but offset in a different transverse plane therefrom, a high frequency shoulder 28 with which the arm 25 may engage earlier in the stroke to thereby shorten the wiping stroke to eliminate the wrap-around area of the windshield. This has the effect of reducing the fluid displacement of the motor which can now move the wiper at a more rapid rate of oscillation on the relatively flat frontal area throughout without a rapid recession over the crest followed by a like ascent on the return stroke. This high frequency shoulder 28 will cooperate with an extended portion of the opposing shoulder 26 to define a high speed range of oscillation for the wiper confined solely to the abbreviated pattern of the frontal area.

The two ranges are selectively placed in operation by axially shifting the kicker inwardly or outwardly to bring either the wide arc shoulders or the narrow arc shoulders within the operating plane of the arm 25. The extended portion of the shoulder 26, to lie coplanar with the high speed shoulder 28, preferably serves to maintain the inner limit of wiper travel common to both ranges although a special shoulder may be provided to shorten the inner limit of travel of the wiper to a minor degree relative to the curtailment of the outer limit of wiper travel. The arrangement is such that in accordance with the setting of the control mechanism the motor imparts to the wiper an oscillation through a larger arc or a smaller arc with the midpoints of the arcs being noncoincident. The two sets of shoulders, one for high frequency wiping as applied to the frontal area and the other for low frequency wiping for the panoramic stroking, are effective in providing plural arcs of blade travel, each arc being fixed by independently functioning range limiting means, said two range limiting means being selectively useable for obtaining the desired arc of blade travel. The frontal portion is always wiped in both ranges of wiper movement. The provision of the high frequency shoulder 28 therefore excludes or cancels out the more sharply curved lateral area of the windshield and acts to confine the high frequency range of cleaning solely to the frontal portion.

For selectively presetting or shifting the kicker from one range position to the other, a mechanism is provided which utilizes a lever 29 having one end flexibly mounted at 30 on the cover 31 for the valve chamber 32, the opposite end of the lever being operatively connected at 33 to the kicker 21. This connection 33 may be in the form of a longitudinal slot or other opening engaging a neck 34 on the kicker with sufficient clearance thereabout to permit relative movement as the lever moves the kicker axially on a reduced part 35 of the motor shaft. For this purpose the kicker has a bearing 36 formed in the back face of the kicker to slidably receive the shaft part 35. The lever 29 is moved in and out manually by a lever connected member or piston 38 operating within a guide or motor chamber 39 and having a stem 40 suitably connected to the medial portion of the lever, as by means of a key slot 41 in the lever receiving a head 42 on the stem. The chamber 39 has a nipple 43 connected by a conduit 44 to a port 45 in a valve face 46 on which latter is slidable a control valve 47 having a recess 47a for alternately connecting the chamber port 45 to a suction supply port 48 which, in turn, is connected by conduit 48a to a source of suction. When the two ports 45 and 48 are in communication with each other by means of the valve recess 47a the pressure differential will move the piston 38 to withdraw the kicker to its broken line position 38a to place the two panoramic range shoulders 26 in the plane of the arm 25. The valve 47, when moved to the position indicated by a dotted line 49, will vent the chamber 39 through the uncovered chamber port 45 to the atmosphere to restore the piston 38 to its inner position under a suitable spring urge. Herein this urge is imparted by forming the lever 29 out of spring stock, for which purpose the lower end of the lever will be anchored firmly by the mounting or rivet 30. When the motor chamber 39 is relieved from its pressure the lever forming spring leaf 29 will then move the kicker to its high speed driving range in which position the arm 25 will cooperate with the shoulder 28 and the extended portion of its opposed shoulder 26.

The control valve 47 may be regulated by any suitable means, such as by fixing it on a shaft 50 that is journaled in the instrument panel of the motor vehicle and rockable by an operating handle 51. For ease in assembling the parts, and for compactness, the shaft 50 may be tubular to telescope over the shaft 13 of the rack and pinion unit 12. The shaft 13 may likewise be hollow to slidably receive a washer actuating rod 52 terminating at one end in a button 53 adjacent the handle 51 for being depressed to actuate a windshield washer through a hose connection 54. This compact arrangement places the range selector 47, 51, the wiper control knob 13a on the shaft 13, and the push button 53 within easy reach of the motorist for complete control in maintaining a clear field of vision through the windshield.

Figures 2, 5:
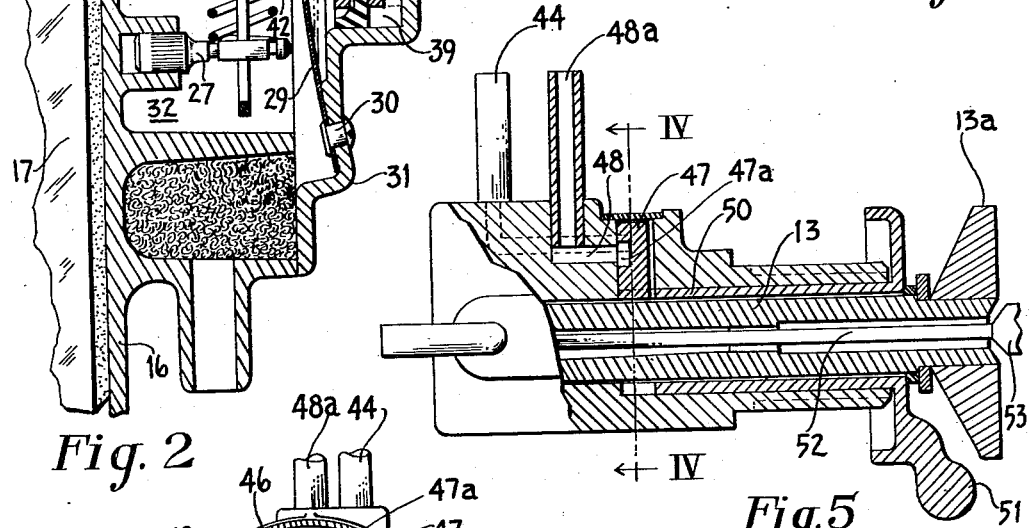
Fig. 2 is a view in vertical section through the valve mechanism and a part of the cleaner motor.
Fig. 5 is a longitudinal sectional view through the control valve, with a portion being left in elevation.
Figure 4:
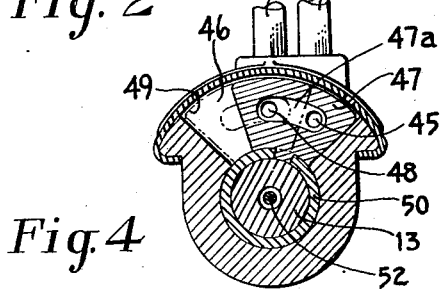
Fig. 4 is a transverse sectional view about on line 4—4 of Fig. 5 showing the control valve.

In the modification shown in Figs. 8 through 11, a hydraulic windshield cleaner system has been disclosed, the same comprising a motor chamber 18' enclosing a vane piston 17' fixed to the wiper shaft 9'. In lieu of the spring snap action shown in Fig. 2 an auxiliary motor 54' is employed to shift the shuttle valve 19' back and forth to reverse the pressure applications on the piston 17' while valve disc 55 is oscillatable on the shaft 9' to alternately connect the pressure chamber 56 to the opposite sides of the chamber of the auxiliary motor 54' for energizing the latter in effecting the reverse applications of fluid pressure to the motor piston. The valving disc 55 is oscillated by a kicker 21' that is keyed to the shaft through the cross pin 57 engaging in the slots 58. The kicker has a lug or arm 59 operable between panoramic or wide arc shoulders 26' on the valve disc to oscillate the latter after the lapse of the time interval for imparting the panoramic stroke to the wiper. The motor has a slidable control valve 61 for operating and arresting the windshield cleaner for connecting the fluid circuit conduits 62 into the motor, these conduits being connected to a suitable source of pressure. This hydraulic motor is more fully described in copending application Serial No. 462,208, now Patent No. 2,802,232. For fitting the high frequency range of wiper movement to the frontal area 2 there is provided an offset shoulder 28' adjacent one or both of the shoulders 26' to be engaged earlier in the piston strokes by the kicker lug 59 to shorten the wiper movement accordingly. To shift the kicker lug 59 inwardly and outwardly into the plane of the shoulder 28' or the shoulder 26', respectively, the piston 38' is mounted within the chamber 39', which latter is connected through a conduit 44' to the intake manifold or other suitable source of suction 64 by means of a dash mounted control valve 47'. A spring 65 backs the piston 38' to normally urge the kicker lug 59 forwardly into the plane of the high frequency shoulder 28'. Upon closing the control valve 47' to connect the chamber 39' to the source of suction the kicker lug 59 will then be withdrawn to the dotted showing 66 into the plane of the panoramic wide arc shoulders 26'.

In both embodiments of the invention it will be obvious that whenever the motorist desires a faster speed, as when traveling on a thruway, or during a heavy downpour, he merely operates the range selector to secure the desired wiper speed which concentrates the wiping action to the frontal portion. For normal driving the motorist will restore the wiper system to its wide arc panoramic range. In both ranges the wiper is maintained in operation always across the frontal portion of the windshield, which is the more vital area, and that the changeover from the wide arc range to the high frequency range is accomplished by shortening the wiper travel at the outer limit of its stroke.

It will be realized that whenever the selector is in its narrow arc position that the spring lever 29 will automatically urge and hold the kicker in a position to operatively relate the shoulder 28 to the arm 25.

Figures 3, 6:
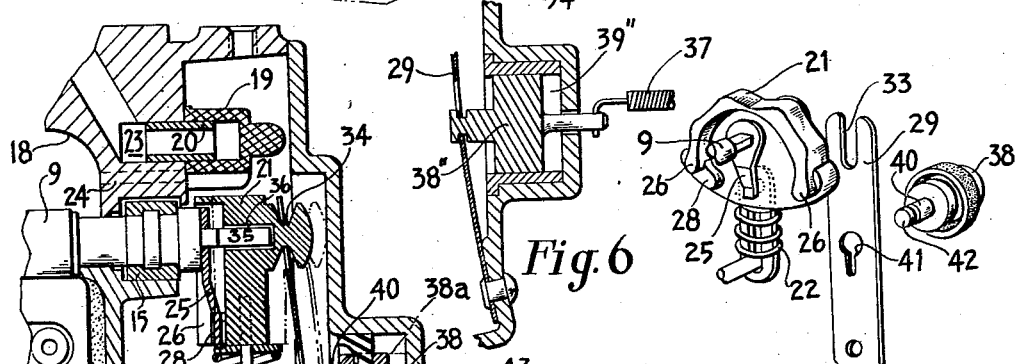
Fig. 3 is an exploded view in fragment of the valve mechanism.
Fig. 6 is a detailed sectional view through a modified selector.

Optionally, the kicker may be shifted manually through a Bowden wire 37, Fig. 6, to slide the lever connected member 38'' within its guide 39'' to move the kicker shifting lever 29.

In lieu of the manual control of the selector valve 47, the latter may be made speed responsive so that upon reaching a predetermined car speed, it will automatically switch over to the higher frequency range of operation.

The schematic showing of Fig. 7 will serve to more clearly illustrate the movement of the wiper on the panoramic portion of the windshield. In this view, the wiper 5 shown in full lines is substantially at the outer limits of the frontal area as shown in Fig. 1. Since the frontal portion is only slightly curved the chord of the arc cleaned thereby is represented by the broken line 2ª which extends inwardly to the innermost limit of blade travel. In the next showing, the wiper is dotted in and moved over onto the crest portion 4 and from this position a chordal line 4ª extends inwardly. Below the crest portion is dotted a wiper positioned on the lateral portion 3 from which extends inwardly the chordal line 3ª. The location of the rock shaft 7 is indicated by the broken line 7ª which is outwardly of the vertical plane of the steering column lengthwise of the vehicle. By such shaft disposition the wiper in its outer limit of travel on the frontal area will be substantially vertical. Outwardly beyond this position lies the crest portion 4 and the lateral portion 3, which portions 3 and 4 drop off rather abruptly to cause the wiper to recede on its outward stroke and to cam upwardly on such portions against the spring urge of the arm 6 on its inward stroke. These lines of demarcation between the portions 2, 3 and 4 are approximate. The inertia of the wiper may carry it more or less short of or beyond these imaginary boundaries dependent upon the frequency or rate of oscillation.

The wiper arm illustrated in Fig. 8 is of the type shown in the aforesaid Patent No. 2,691,186, wherein an outer blade carrying section 60 of the arm is rockable about an axis substantially longitudinally of the blade, and this rocking is controlled by a cam arrangement including a cam plate 6' fixed adjacent the rock shaft and a follower 6'' on the arm section 60 which cooperates with the cam plate to hold the blade in an attitude normal to the surface being wiped while passing thereover. The cam plate 6' serves to rock the arm section 60 sufficiently to maintain the blade in a normal attitude at all times to the surface as it moves around the crest portion 4 in negotiating the panoramic path. This blade normalizing arrangement acts to maintain the wiper always upright on the immediate surface portion. In accordance with this patent the cam 6' serves to hold the wiper substantially fixed as it moves over the relatively flat frontal area so that for the higher frequency of operation over the frontal area the wiper normalizing unit 6', 6'', has its follower moving over a substantially flat cam contour. However, when the panoramic lower frequency of operation is selected the cam contour will act on the follower to rock the outer arm section to rapidly change this position so as to hold the wiper in a constant relationship with the surface being wiped. This change in adjustment of the outer arm section serves to hold the wiper in its proper attitude for efficiently wiping the surface, and it is only when the wiper moves downwardly from the frontal area that the normalizing mechanism becomes effective for displacing the outer arm section for holding the proper attitude of the wiper on the deeper curvature of the crest area and the angularly displaced lateral area.

While a fluid pressure motor has been utilized as the drive for the windshield cleaning system, the invention is not limited thereto since other power means may be utilized such as the power plant of the motor vehicle or an electric motor.

The foregoing description has been made in detail without thought of limitation since the inventive principles involved are capable of assuming other physical embodiments without departing from the spirit of the invention and the scope of the appended claims.

What is claimed is:

1. In combination, a curved windshield having a relatively flat frontal area and a lateral area joined thereto by a more sharply curved crest and forming a continuous surface affording an uninterrupted panoramic field of vision forwardly and to the side, an oscillatory wiper having two ranges of movement, one range being around the crest and substantially coextensive with the panoramic field and the other range being short of the lateral area and substantially coextensive with the frontal area, drive means connected to the wiper for oscillating it, and selector means operable at will to select either range.

2. A motor vehicle having a curved windshield with frontal and lateral areas joined by a relatively sharper crest portion and forming therewith a continuous surface affording an uninterrupted panoramic field of vision to the front and side, an oscillatory wiper having two paths of movement both including the frontal area and one path including an extension over into the lateral area so that the wiper when moved in said one path will wipe the lateral area and the crest portion, a fluid drive connected to the wiper for oscillating it throughout both paths, wiper normalizing means operable to laterally rock the wiper on the crest portion when moving thereover to maintain a substantially constant attitude on the surface being wiped, and selector means operable to cancel out the wiper path extension to the lateral area.

3. A motor vehicle having a curved windshield with frontal and lateral areas joined by a relatively sharper crest portion and forming therewith a continuous surface affording an uninterrupted panoramic field of vision to the front and side, an oscillatory wiper having two paths of movement, one predominately covering the frontal area and the other including both frontal and lateral areas and the crest portion, wiper normalizing means operable laterally to tilt the wiper when moving from one area to the other, a drive connected to the wiper for oscillating it through either path, and selective means operable to cancel out the part of the wiper path extending to the lateral area.

4. A motor vehicle having a curved windshield with a frontal area joined to a lateral area by a relatively more sharply curved crest portion, a wiper, a rockshaft journaled at the lower side of the frontal area, a wiper carrying arm rockable with the shaft to impart a panoramic stroke to the wiper across the frontal area around the crest portion and onto the lateral area and retracing its movement back up over the crest portion, wiper tilting means operable by and during the wiper panoramic movement to cause the wiper to remain in a normal attitude with changes in the surface curvature from one area to the other, means operable to confine the wiper stroke predominately to the frontal area, and selector means operable at will to restrict the wiper to the frontal area or to secure the panoramic stroke to the lateral area.

5. A motor vehicle having a curved windshield with a frontal area joined to a lateral area by a relatively more sharply curved crest portion, a wiper, a rockshaft journaled at the lower side of the frontal area, a wiper carrying arm rockable with the shaft to impart a panoramic stroke to the wiper over the frontal area and the crest portion onto the lateral area and retracing its movement back up over the crest portion, surface pattern means operable to adjust the wiper to the surface area to maintain an attitude substantially constant therewith, and means operable to confine the wiper stroke predominately to the frontal area.

6. In combination with a curved windshield having relatively flat frontal and lateral areas and a connecting crest portion of greater curvature, a dual purpose windshield wiper system for the windshield having a pair of wiper blades for being oscillated thereover a pair of wiper arm pivot shafts positioned to move the blade in an arcuate path from the frontal areas for the primary line of sight ahead, a two range motor operatively connected to the pivot shafts, and a remote control for the motor connected to optionally and selectively increase the wiping travel of said blades over onto the crest portions and the lateral areas said remote control including means to cancel the crest portions and the lateral areas from the sweep of the wiper blades thereby to lessen the distance of wiper travel on the shield.

7. A motor vehicle having a highway viewing system including a curved windshield having a substantially flat frontal area flanked at each side by a substantially flat lateral area joined thereto by a crest area of sharper curvature, combined with a windshield wiping mechanism comprising wiping blades arranged for wiping oscillatory movements over such frontal, crest and lateral areas, a variable displacement fluid differential pressure operated motor for selective operation of said blades over the flat frontal area or about the curved crest area, and control means for determining the motor displacement conformable to operation of blades over said frontal area alone or over said three areas concurrent with a corresponding inverse ratio between amplitude and frequency of said oscillatory movement.

8. In combination, a curved windshield having a relatively flat frontal area and a lateral area jointed thereto by a more sharply curved portion and forming a continuous surface affording an uninterrupted panoramic field of vision forwardly and to the side, an oscillatory wiper having two ranges of movement, one range for wiping the panoramic field and the other for wiping only the relatively shorter frontal area, drive means connected to the wiper for oscillating it, wiper normalizing means cooperating with the drive means to adjust the wiper to maintain it normal to the changing contour of the panoramic field, and selector means operable at will to select either range.

9. A windshield cleaner motor of the fluid pressure type having a chamber and a piston movable back and forth relative to each other and operatively connected to a shaft for oscillating it, a valve mechanism for operatively reversing the pressure differential on the piston and having a shaft actuated oscillatory member for effecting reversal of the pressure differential, said oscillatory member being provided with two sets of shoulders with the shoulders of each set being relatively fixed and alternately engageable by a shaft driven part, said part and oscillatory member being coaxially related and relatively displaceable axially to selectively relate the part to either set of shoulders, the shoulders of one set having a greater angular displacement than the shoulders of the other set, and selector means operable to selectively relate the shaft part with either set of shoulders.

10. A windshield cleaner motor of the fluid pressure type having a chamber and a piston movable back and forth relative to each other and operatively connected to a shaft for oscillating it, a valve mechanism for operatively reversing the pressure differential on the piston and having an oscillatory member and a cooperating member for effecting reversal of the pressure differential, one member being provided with two sets of shoulders in relatively offset planes lying transversely of the shaft with the shoulders of each set being relatively fixed and alternately engageable by the other member, one of said members being oscillated by said shaft, said members being coaxially related and relatively shiftable axially of the shaft to selectively relate said cooperating member with either set of shoulders, the shoulders of one set having a greater angular displacement than the shoulders of the other set, and selector means operable to so relate the cooperating member with either set of shoulders.

11. A windshield cleaner motor according to claim 10, wherein means are provided to automatically restore said members in a normal relation with one set of shoulders.

12. A windshield cleaner motor according to claim 10, wherein said selector means include fluid pressure actuated means for shoulder set selectivity of operation.

13. A cleaner for an irregularly curved windshield having a forward vision field and a panoramic vision field, the latter including the forward field and a lateral portion joined thereto by a relatively sharp crest area, an oscillatory wiper having two ranges of movement, one range being coextensive with the forward vision field and the other range being offset relatively to said one range and coextensive with the panoramic vision field, and drive means selectively operable to oscillate the wiper through either range.

14. In a windshield wiper system for a motor vehicle, a pair of wiper blades mounted on blade carrying arms pivoted to be oscillated on a wraparound windshield having a broad frontal section and adjoining lateral portions, means for selectively establishing two wiping patterns on different center lines on said windshield, one center line being in proximity to the vertical plane of the steering column and the other center line being displaced angularly from the first center line toward the center of the vehicle, and a motor including control means to differentially vary the opposite extents of sweep of the wipers for shortening the outward sweep predominately to effect a consequential shift of the center line thereof, said selective means operable to position said control means to effect reversal of blade movement at a different position of said blades and to a differential extent at the opposite ends.

15. In a windshield wiper for wide windshields having frontal and lateral sections of vision, preset selective control means for one or another fixed distance of blade travel for altering the width of range of vision, and control mechanism for determining said blade travel including means responsive to said control mechanism to shift said control means for wiping selectively the two fixed and predetermined wiping patterns.

16. In a windshield wiper for wide windshields having frontal and lateral sections of vision, preset selector control means for one or another distance of blade travel including means for predetermining one of the ranges of travel, and manually actuated means for controlling the preset selector means to effect the operation of the wiper in the other range of travel according to the option of the driver of the vehicle.

17. In a windshield wiper for wide windshields having frontal and lateral sections of vision, preset selective control means shiftable to effect either a long or a short fixed distance of blade travel, and manual selector means for determining said blade travel, including means for differentially curtailing the longer path of blade travel to reduce the extent of outward sweep while holding the extent of inward sweep with a smaller amount of curtailment.

18. A windshield cleaner for panoramic type windshields having surface contours of compound or irregular curvature for affording an uninterrupted field of vision extending from a frontal area outwardly over a lateral area and an included and relatively sharper crest area, said cleaner comprising a wiper and a motor for oscillating the same in a path extending over the three areas, and differential curtailing means selectively operable to shorten the path at its outer end and thereby to confine the wiper path substantially to the frontal area alone.

19. A windshield cleaner for panoramic type windshields having surface contours of compound or irregular curvature for affording an uninterrupted field of vision extending from a frontal area to a lateral area over an included and relatively sharper crest area, said cleaner comprising a wiper and a motor for oscillating the same in a path extending over the three areas, the inner end of the path being central of the windshield and the outer end being on the lateral area, path-curtailing means operable disproportionately to shorten the wiper path at its outer end to exclude the lateral area while maintaining the inner end of the path substantially constant, and selector means operable to cause the wiper to travel the first path or to travel the shortened path.

20. The combination expressed in claim 1, the arrangement being such that in accordance with the operation of said selector means the midpoints of the larger and smaller arcs of the wiper are noncoincident.

21. The combination expressed in claim 1, wherein each range is fixed by an independent range limiting means and said selector means are operable to alternately use one or another of said two range limiting means.

22. A windshield cleaner comprising a wiper, a motor of the fluid pressure type having a chamber and a piston operatively connected to a wiper actuating shaft for oscillating it, a valve mechanism operatively reversing the pressure differential on the piston and including means determining two different limits of arcuate wiper travel, said determining means having two fixed range limiting means independently selectable, and selector means operable to use either one of said determining means.

References Cited in the file of this patent

UNITED STATES PATENTS

| | | |
|---|---|---|
| 2,075,959 | Previte | Apr. 6, 1937 |
| 2,401,961 | Rappl | June 11, 1946 |
| 2,697,419 | Krohm | Dec. 21, 1954 |